United States Patent [19]

Busse et al.

[11] 4,105,559
[45] Aug. 8, 1978

[54] PLATE-TYPE FILTER PRESS

[75] Inventors: Oswald Busse; Hugo Klesper, both of Aarbergen, Fed. Rep. of Germany

[73] Assignee: Passavant-Werke Michelbacher Hutte, Aarbergen, Fed. Rep. of Germany

[21] Appl. No.: 784,611

[22] Filed: Apr. 4, 1977

Related U.S. Application Data

[63] Continuation-in-part of Ser. No. 701,081, Jun. 30, 1976, Pat. No. 4,076,033.

[30] Foreign Application Priority Data

Apr. 27, 1976 [DE] Fed. Rep. of Germany ....... 2618437

[51] Int. Cl.² ............................................. B01D 25/32
[52] U.S. Cl. .................................................. 210/225
[58] Field of Search ............... 210/225, 226, 231, 236; 100/112, 115, 251; 134/76, 77; 248/55, 317, 323, 340, 341

[56] References Cited

U.S. PATENT DOCUMENTS

| 2,192,868 | 3/1940 | Malkin | 210/236 |
| 3,292,790 | 12/1966 | Tum et al. | 210/236 |
| 3,306,445 | 2/1967 | Moziek | 210/230 X |
| 3,446,358 | 5/1969 | Kratochril et al. | 210/236 X |
| 3,486,624 | 12/1969 | Syltes | 210/236 |
| 3,568,852 | 3/1971 | Howard | 248/340 |

Primary Examiner—Theodore A. Granger
Attorney, Agent, or Firm—Woodford R. Thompson, Jr.

[57] ABSTRACT

A plate-type filter press having filter plates suspended by centrally disposed support means is provided with a flushing unit insertable from below into the space between adjacent filter plates. Guide means are arranged in the proximity of at least one of the upper corners of the filter plates to prevent the plates from swinging relative to the support means and still permit insertion of the flushing unit between adjacent filter plates.

5 Claims, 3 Drawing Figures

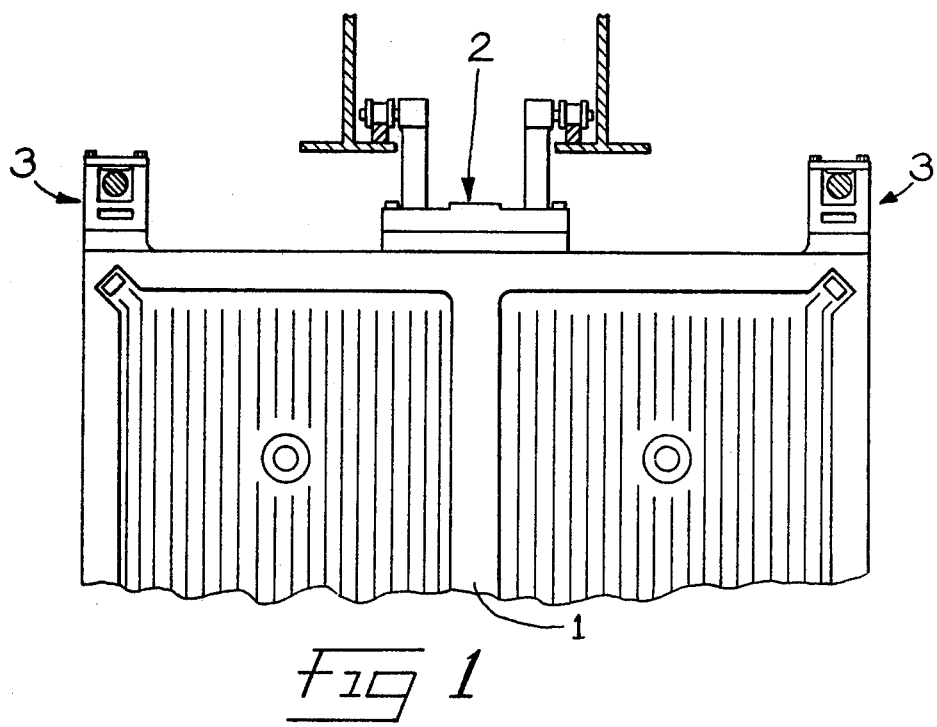
Fig 1
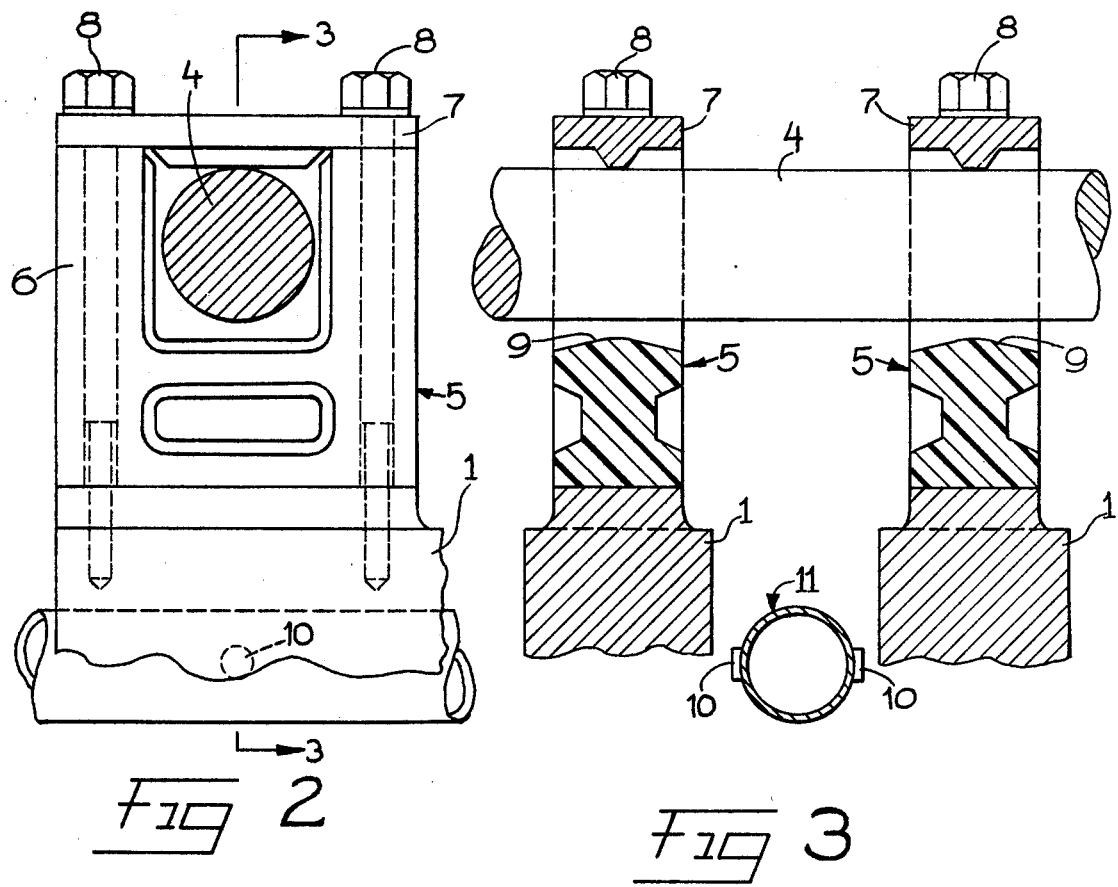
Fig 2
Fig 3

PLATE-TYPE FILTER PRESS

CROSS REFERENCE TO RELATED APPLICATION

This application is a continuation-in-part of application Ser. No. 701,081, filed Jun. 30, 1976, now Pat. No. 4,076,033 in the name of Oswald Busse and Hugh Klesper.

BACKGROUND OF THE INVENTION

This invention relates to a plate-type filter press embodying centrally suspended filter plates with guide means to prevent the plates from swinging back and forth and a flushing device having a spray tube which is insertable from below and between adjacent filter plates.

In filter presses heretofore employed, in particular for the dewatering of sewage sludges, the filtration chambers are opened by pulling adjacent filter plates apart so that the filter cake can drop out. A disadvantage encountered in the use of known apparatus lies in that remnants of filter cake adhere to the filter cloths and that these remnants gradually decrease the permeability of the filter cloths. Accordingly, the cloths are flushed at regular intervals with water under pressure to remove such remaining solids.

This flushing operation is carried out by moving a spray tube into the space between every two adjacent, separate filter plates. The simplest solution, in view of kinematics, is a design wherein the spray tube is horizontally arranged and guided at both ends so as to be introduced from below into the open filter chambers between adjacent filter plates.

Heretofore, this washing operation has been a time consuming procedure. This is primarily due to the guide elements which prevent the filter plates from swinging back and forth while they are being moved. Such prior art guide elements are in the form of rods which extend adjacent the lower edges of the filter plates over the entire length of the filter press and are engaged from above by conventional lug means arranged on the filter plates. This design requires the rods to be unlocked and disengaged from the lugs before the spray nozzle can be operated.

SUMMARY OF THE INVENTION

The present invention obviates the above disadvantage by providing a filter press wherein the plates can be cleaned by means of the flushing device without any preparational work being required. This is realized in accordance with our invention by providing a plate-type filter press wherein guide elements are arranged in the proximity of at least one of the upper corners of the filter plate. Accordingly with our invention, the spray nozzle of the flushing device can easily be inserted from below into the open filtration chambers. An additional advantage lies in that the filter plates even during the flushing operation, which, as is well known, requires stepwise displacement of the filter plates, are guided to prevent them from swinging back and forth. And last but not least, the improved features of the present invention serve to protect the surroundings from being polluted by filter cakes dropping out of the filter press. Heretofore, filter cakes have occasionally dropped onto the lower guide rods by splattering laterally from the filter press.

The guide elements according to our invention are no longer required to be spaced at maximum distance from the central suspension means, as would be the case if the guide elements were arranged at the lower corners of the filter plates. We have found, not only in large but also in medium and small filter plates, that the space between the upper corners of the filter plate and the central suspension means is sufficient to accommodate guide means to prevent oscillating movements.

The guide means according to our invention preferably consist of a closed guide block surrounding each guide rod. The enclosing of the guide rod assures optimum guiding action. In addition, the guide blocks may serve as suspension means for the filter plates in case the central suspension means should break for any reason. Accordingly, the filter plates will be prevented from dropping down whereby repair work can be postponed until such time as repair is convenient. The guide block may be detachably mounted on the filter plates so as to be replaced whenever necessary.

Each guide block preferably comprises a U-shaped base part and a locking piece secured thereon. This construction has the advantage of being particularly simple. Also, screw means may be provided for fastening not only the locking piece to the base part but also the base part to the filter plate.

As an additional advantage the surfaces of the guide blocks directly in contact with the guide rod have chamfered of beveled edges which reduces friction inside the guide means. This is especially important in view of the fact that there should be a minimum of friction between the inner surface of the locking piece and the guide rod. Friction is further reduced by forming the guide blocks of plastic material.

DESCRIPTION OF THE DRAWING

The invention will now be described more in detail, reference being had to a preferred embodiment illustrated in the accompanying drawing, wherein:

FIG. 1 is a fragmental, front view of a filter plate with the support and guide means therefor being partially in section;

FIG. 2 is an enlarged fragmental front view of the guide means; and

FIG. 3 is a fragmental sectional view taken generally along line 3—3 of FIG. 2 and showing a pair of adjacent filter plates with flushing means therebetween.

DETAILED DESCRIPTION

Referring now to FIG. 1, there is illustrated a filter plate 1 having a conventional central suspension unit 2 enabling a displacement of the filter plate in a direction perpendicular to the plane of the filter plate or vertical to the drawing plane. In addition, guide means 3 is provided at the upper corner of each plate to prevent the plates from swinging to and fro.

The guide means 3 is shown clearly in FIG. 2 and FIG. 3 and comprises a guide rod 4 which is completely enclosed around the entire surface thereof by a guide block 5. The guide block 5 comprises a U-shaped base part 6 and an upper locking element 7 connected thereto by screw members 8 which extend through the locking element 7 and through the base part 6 and into the filter plate 1.

As shown in FIG. 3, the inner surfaces of the guide block 5 which contact the guide rod 4 have chamfered or bevelled edges to reduce friction and thereby facilitate movement of the guide block 5 relative to the guide rod 4. To reduce friction further, the guide block 5 is made of plastic material.

In certain cases it may be sufficient to provide guide means 3 at only one corner of the filter plate 1. In all cases the lower plate area up to the central suspension unit 2 and to the guide means 3 is free of additional components, so that a spray nozzle 10 of a flushing device 11 can be introduced from below and in parallel relationship with the plane of the filter plates 1 and the space between adjacent filter plates 1.

What we claim is:

1. A plate-type filter press comprising vertically extending filter plates suspended by centrally disposed upper support means for horizontal stepwise movement to define a space between adjacent filter plates, a flushing device having horizontally arranged spray nozzles and mounted for movement from a position below said filter plates into and within the confines of said space between adjacent filter plates, guide means carried by at least one upper corner of each filter plate, and an elongated guide member extending horizontally and parallel to said upper support means adjacent said upper corner in position to engage said guide means and prevent the filter plates from swinging laterally and back and forth relative to said support means.

2. A plate-type filter press as defined in claim 1 in which said guide member comprises a guide rod and each said guide means comprises a closed guide block mounted at the upper corner of each filter plate and closed around and contacting said guide rod.

3. A plate-type filter press as defined in claim 2 in which each said guide block comprises a U-shaped base member and a locking element secured thereon.

4. A plate-type filter press as defined in claim 2 in which the inner surfaces of said guide block which contact said guide rod have camfered edges.

5. A plate-type filter press as defined in claim 2 in which each said guide block is made of plastic material.

* * * * *